US012047728B2

(12) United States Patent
Miwa

(10) Patent No.: US 12,047,728 B2
(45) Date of Patent: Jul. 23, 2024

(54) EARPHONE

(71) Applicant: JVCKENWOOD CORPORATION, Yokohama (JP)

(72) Inventor: Yasuhiro Miwa, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 156 days.

(21) Appl. No.: 17/742,822

(22) Filed: May 12, 2022

(65) Prior Publication Data

US 2022/0272433 A1 Aug. 25, 2022

Related U.S. Application Data

(63) Continuation of application No. PCT/JP2020/040864, filed on Oct. 30, 2020.

(30) Foreign Application Priority Data

Nov. 13, 2019 (JP) ................................ 2019-205408

(51) Int. Cl.
*H04R 1/10* (2006.01)

(52) U.S. Cl.
CPC ........... *H04R 1/105* (2013.01); *H04R 1/1016* (2013.01)

(58) Field of Classification Search
CPC .............................. H04R 1/1016; H04R 1/105
See application file for complete search history.

(56) References Cited

U.S. PATENT DOCUMENTS

2002/0041697 A1* 4/2002 MacDonald ........... H04R 1/105 381/381
2010/0074462 A1 3/2010 Lee et al.
2011/0164778 A1* 7/2011 Wengreen ............ H04R 1/1066 381/381

FOREIGN PATENT DOCUMENTS

CN 2627772 Y 7/2004
JP 2005328118 A 11/2005
JP 2012244515 A 12/2012
JP 5527282 B2 6/2014
JP 2015195444 A 11/2015

OTHER PUBLICATIONS

International Search Report issued on Jan. 12, 2021 for application No. PCT/JP2020/040864.

* cited by examiner

*Primary Examiner* — Sunita Joshi
(74) *Attorney, Agent, or Firm* — Nath, Goldberg & Meyer; Jerald L. Meyer

(57) ABSTRACT

An earphone includes a body part, a supporter, and a recess-projection engagement part. In particular, the earphone includes the body part, the supporter attached to the body part, and the recess-projection engagement part configured to allow the supporter to be engaged to the body part selectively at any of a plurality of positions defined in an extending direction of an axial line of the body part.

5 Claims, 9 Drawing Sheets

EARPHONE

CROSS REFERENCE TO RELATED APPLICATION

This application is a Continuation of PCT Application No. PCT/JP2020/040864, filed on Oct. 30, 2020, and claims the priority of Japanese Patent Application No. 2019-205408, filed on Nov. 13, 2019, the entire contents of both of which are incorporated herein by reference.

BACKGROUND

The present disclosure relates to earphones.

Earphones are known that include a body part, and a supporter that extends from the body part and is hooked on the outside of the auricle or is fitted to the inside of the auricle so as to allow the body part of the earphone to be stably fitted to the auricle.

Japanese Patent No. 5527282 discloses an earphone that includes a hooked part referred to as a hanger or a hook serving as a supporter. The earphone disclosed in Patent Literature 1 includes a body part having a sound channel part to which an ear piece is attached so as to be inserted to the external auditory meatus when used, and an ear-hooked part connected to the body part so as to be hooked on the outside of the auricle when used. The ear-hooked part is referred to below as a hook.

SUMMARY

The shape of the auricle, and the position and the direction of the earhole of the external auditory meatus with respect to the auricle vary between individuals who use earphones.

In the conventional earphone including the hook as a supporter as disclosed in Japanese Patent No. 5527282, the extending position or angle of the hook with respect to the body part is fixed. This frequently does not lead the user to have a comfortable fitting feeling when putting the earphone on the auricle, which still needs to be improved.

A first aspect of one or more embodiments provides an earphone including a body part including a cylindrical part and formed to project to an outside of an auricle of a user, a supporter attached to the body part, and a recess-projection engagement part configured to allow the supporter to be engaged to the body part selectively at any of a plurality of positions defined in an extending direction of an axial line of the body part.

The earphone according to one or more embodiments enables each individual user to have a comfortable fitting feeling when putting the earphone on.

DETAILED DESCRIPTION

An earphone according to one or more embodiments is illustrated below with an earphone 91 including a hook 2 in one example.

Example

Figure 1:
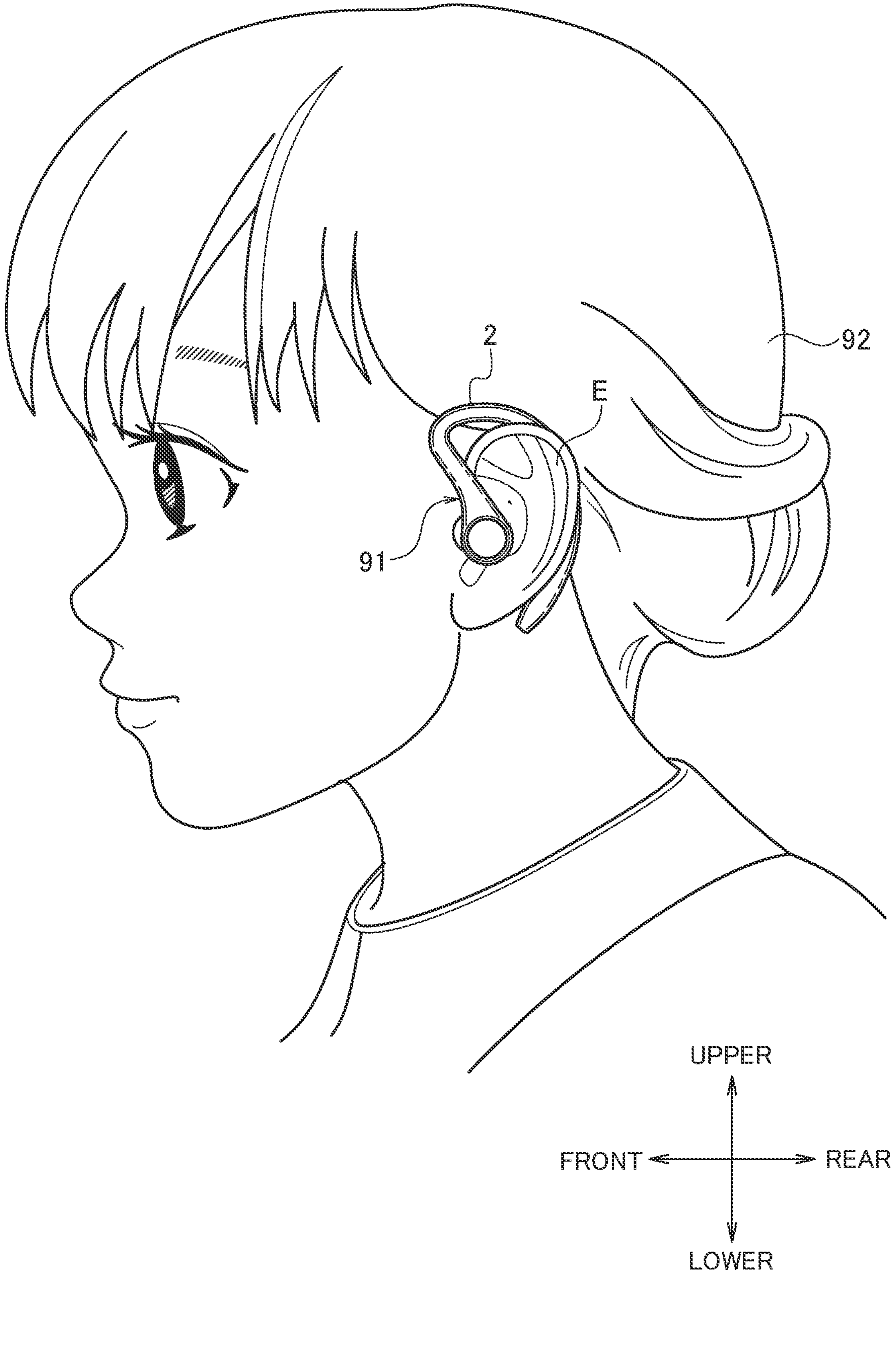
FIG. 1 is a view illustrating a state in which an earphone 91 of one example according to an embodiment is put on the left auricle E of the user 92.

FIG. 1 is a view illustrating the head of the user 92 on the left side with the earphone 91 put on the left auricle E. The earphone 91 is a canal-type wireless earphone, and includes a hook 2 serving as a supporter to be hooked on the outside of the auricle E.

The earphone 91 illustrated is used for the left ear and put on the left auricle E. The earphone for the right ear has the symmetrically same structure as the earphone 91 for the left ear. The present example is illustrated below with the earphone 91 for the left ear.

The upper, lower, right, and left directions are defined by the respective arrows indicated in FIG. 1 for illustration purposes. The left direction is defined from the back side toward the front side on the drawing, and the right direction is defined from the front side toward the back side on the drawing.

Figure 2:
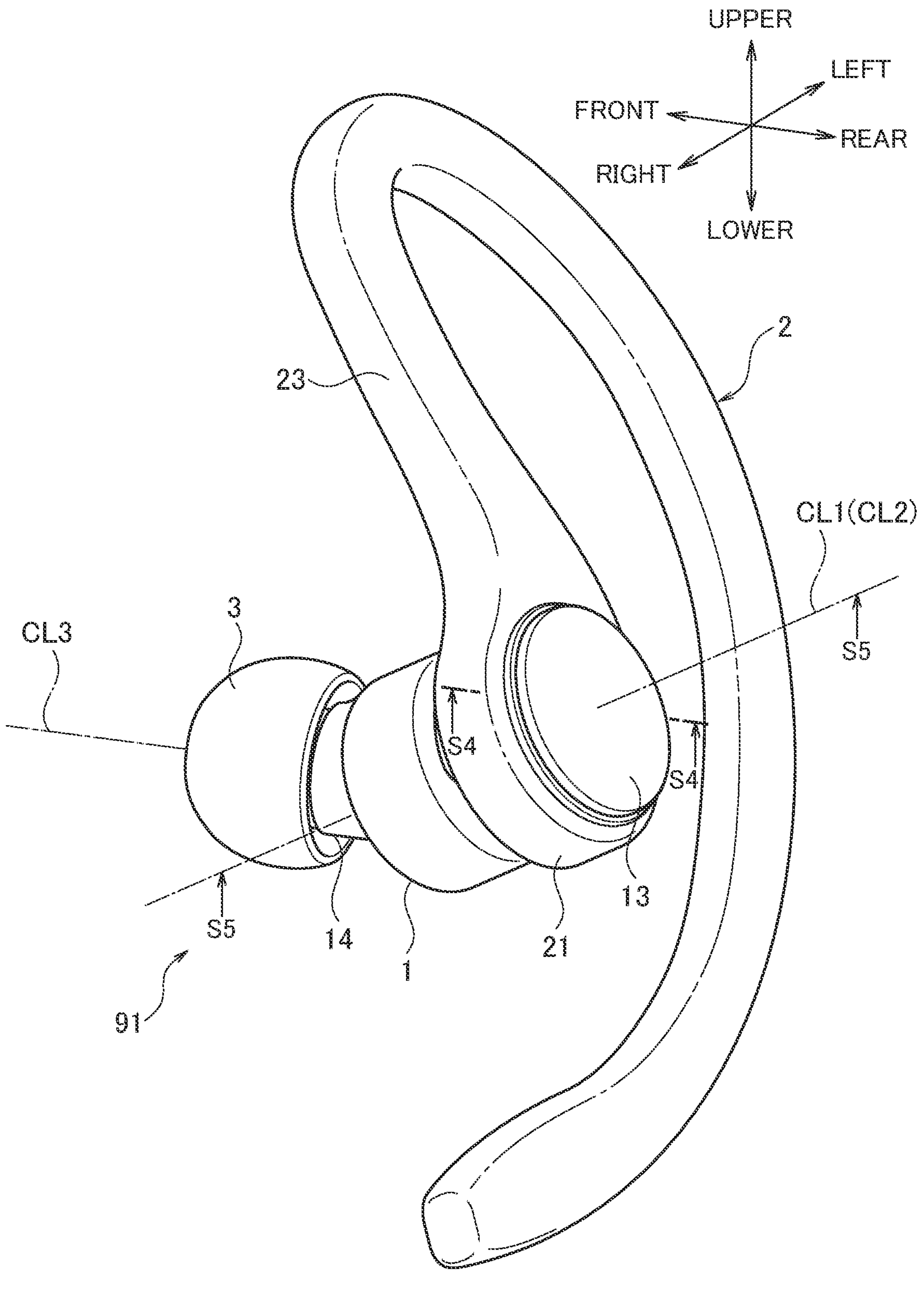
FIG. 2 is a perspective view of the earphone 91 as viewed in the diagonally front and lower-left direction.
Figure 3:
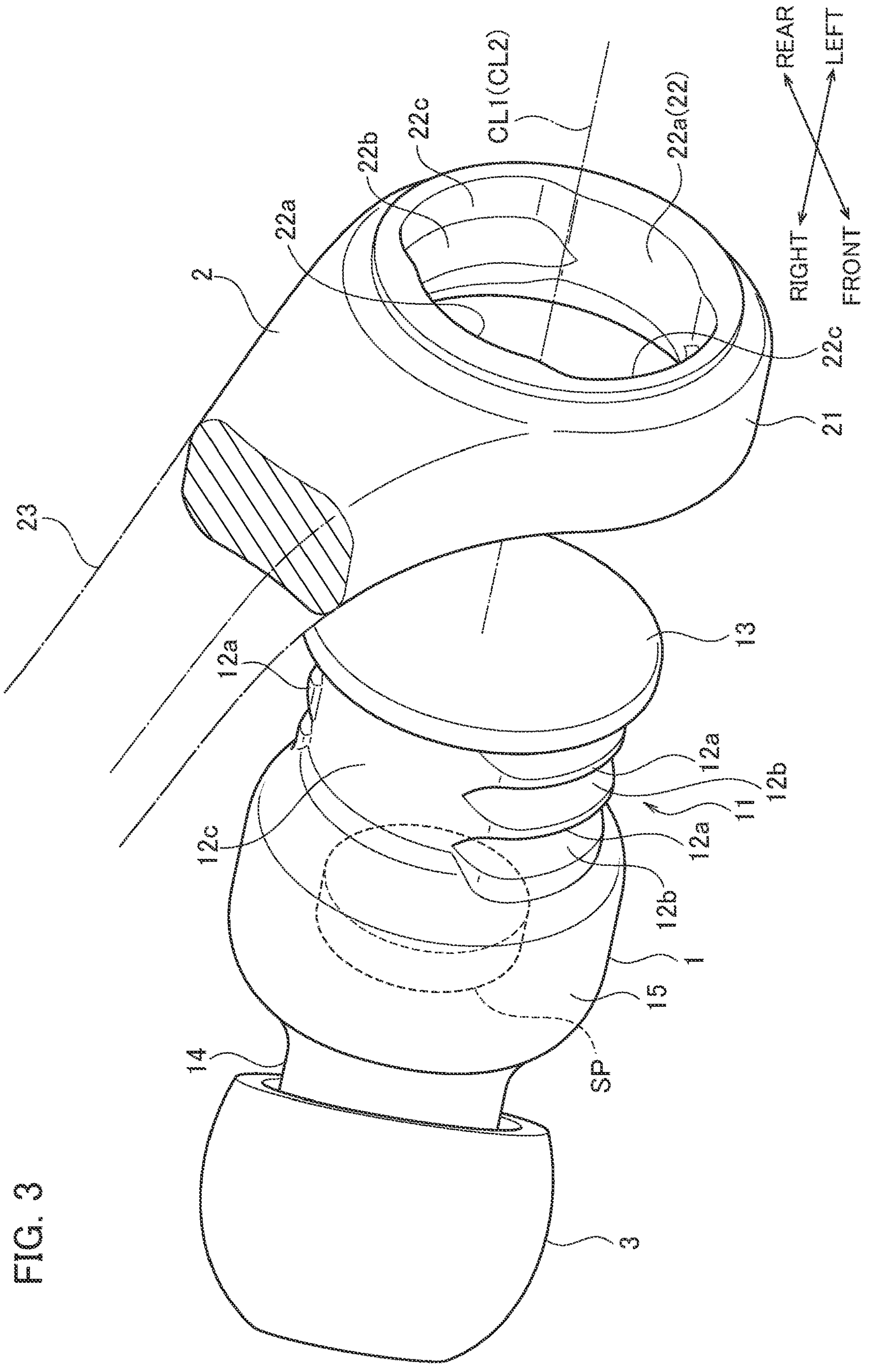
FIG. 3 is an exploded perspective view of the earphone 91 in a state in which a body part 1 and a hook 2 are separated from each other.

FIG. 2 is a perspective view of the earphone 91 as viewed in the diagonally front and lower-left direction, and FIG. 3 is an exploded perspective view.

As illustrated in FIG. 2 and FIG. 3, the earphone 91 includes a body part 1 having a substantially cylindrical shape, and the hook 2 attached to an attachment part 11 of the body part 1.

A speaker unit SP illustrated in FIG. 3 and a signal processing unit (not illustrated) are housed inside the body part 1.

The signal processing unit wirelessly receives a voice signal output from an external voice reproducing device, and outputs the signal by producing sound from the speaker unit SP.

The body part 1 includes a sound channel part 14 at a right end part projecting in the diagonally right and front-upper direction. An ear piece 3 is removably attached to the sound channel part 14.

The sound output from the speaker unit SP is emitted to the outside from the tip of the ear piece 3 through the inside of the sound channel part 14.

As illustrated in FIG. 3, the body part 1 includes a base part 15, the attachment part 11, and a flange 13 sequentially positioned from the sound channel part 14 side.

The base part 15 has a substantially cylindrical shape. The axial line of the base part 15 is indicated by CL1. The axial line CL1 conforms to the axial line of the body part 1.

The attachment part 11, to which the hook 2 is attached, has a smaller diameter than the base part 15.

The flange 13 is formed to have substantially the same outer diameter as the base part 15.

Figure 4:
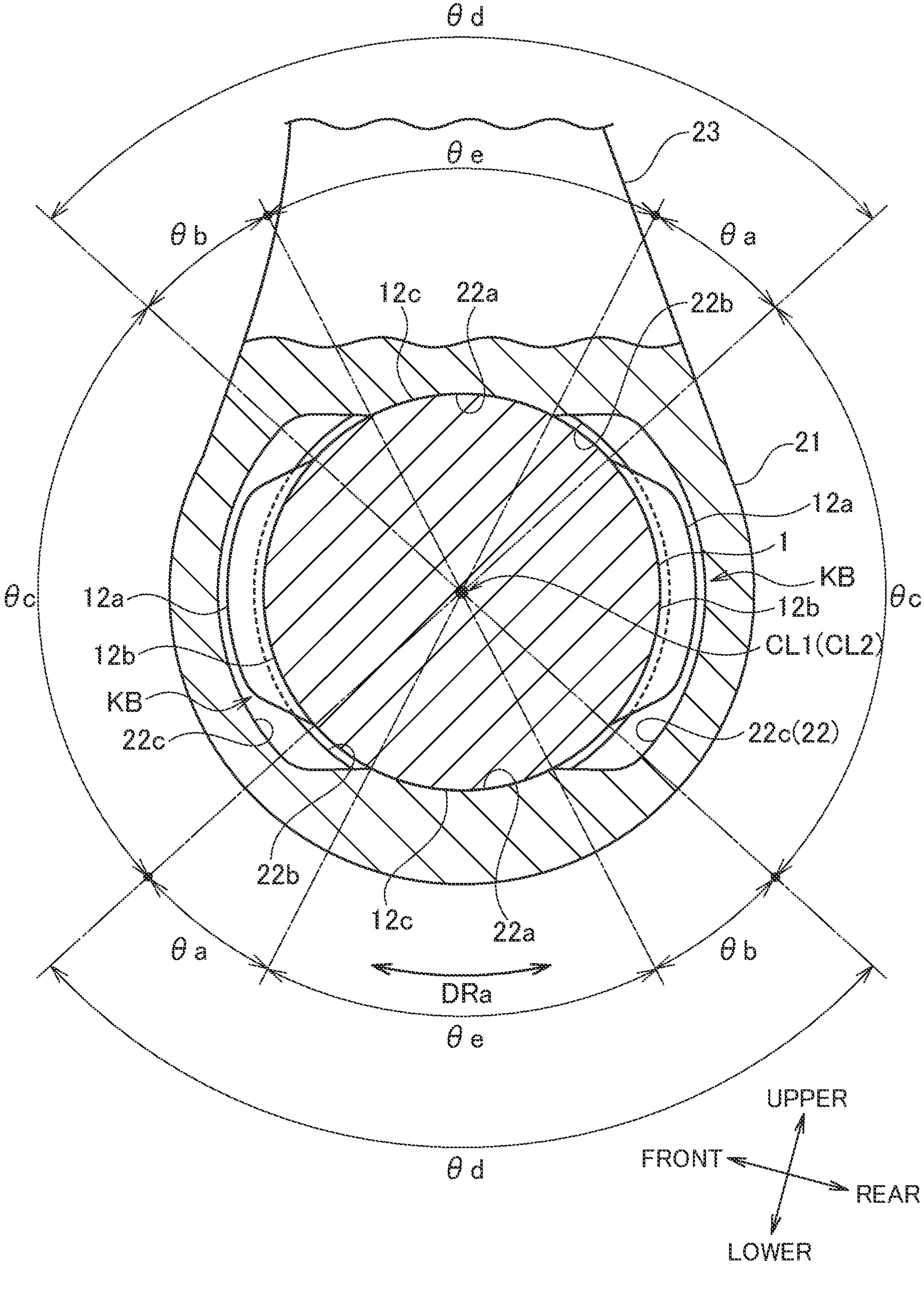
FIG. 4 is a lateral cross-sectional view of the earphone 91 taken along the position S4-S4 in FIG. 2.
Figure 5:
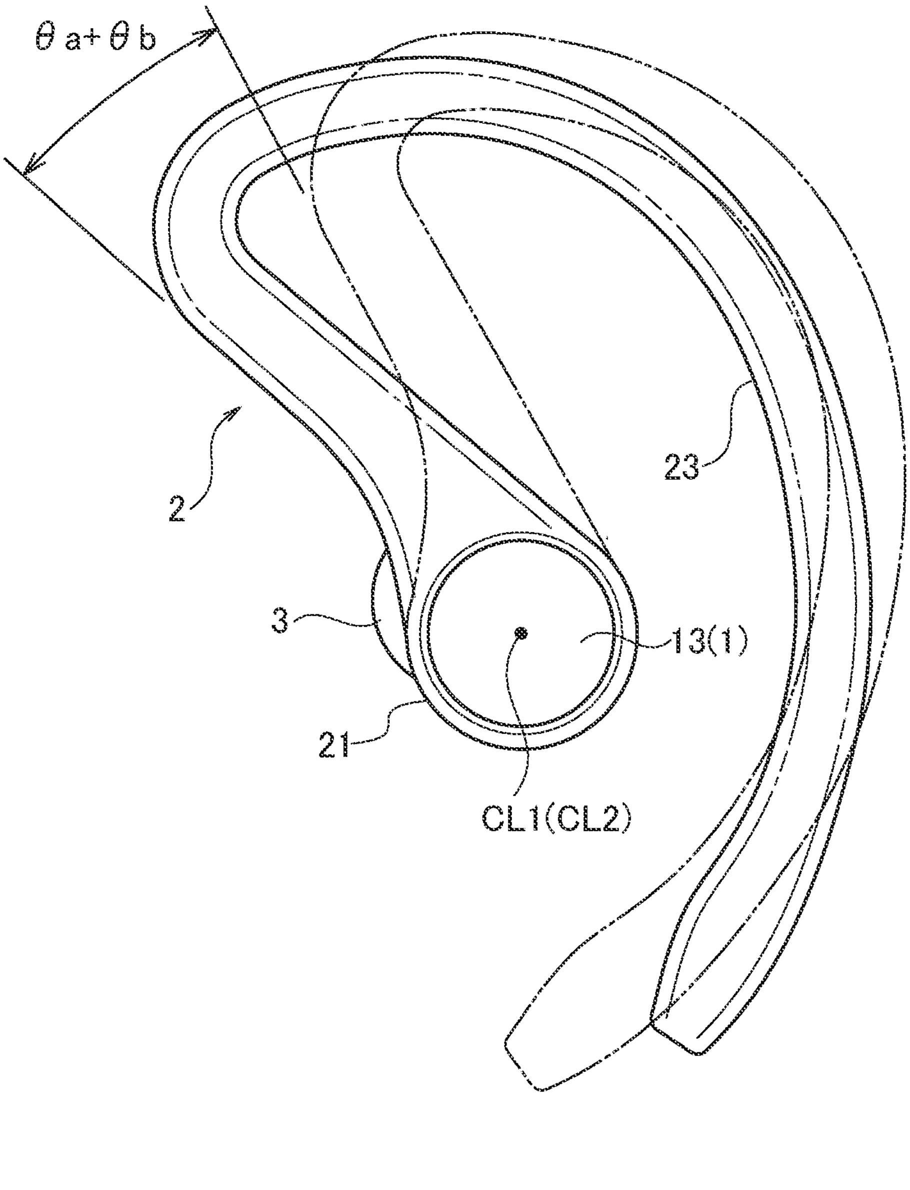
FIG. 5 is a left view of the earphone 91 for explaining a rotational movement of the hook 2 with respect to the body part 1.

The lateral cross-sectional shape and the vertical cross-sectional shape of the attachment part 11 are each illustrated in FIG. 4 and FIG. 5.

The body part 1 is formed from hard resin or metal. An example of resin is ABS, and an example of metal is aluminum.

As illustrated in FIG. 3 to FIG. 5, the attachment part 11 incudes a plurality of projections 12*a* elongated in the circumferential direction and separated from each other in the direction of the axial line CL1 of the body part 1 (in the substantially right-left direction). The number of the projections 12*a* in this example is two.

In particular, the paired projections 12*a* are separated from each other by 180 degrees in the circumferential direction so as to be opposed to each other, and are each elongated within a range of an angle θc.

A range of an angle (d not provided with the projections 12*a* in the attachment part h is defined as a small-diameter circumferential part 12*c* having a smaller diameter than the base part 15.

A pair of the small-diameter circumferential parts 12*c* is separately provided so as to be opposed to each other in this example.

The attachment part 11 includes a pair of recesses 12*b* hollowed into an arc-like shape in the lateral cross section, in which one of the recesses 12*b* is located between the two projections 12*a*, and the other recess 12*b* is located on the right side of the right projection 12*a* in the direction of the axial line CL1. The attachment part 11 thus includes two sets of the paired recesses 12*b* separated by 180 degrees so as to be opposed to each other in the circumferential direction.

Figure 6:
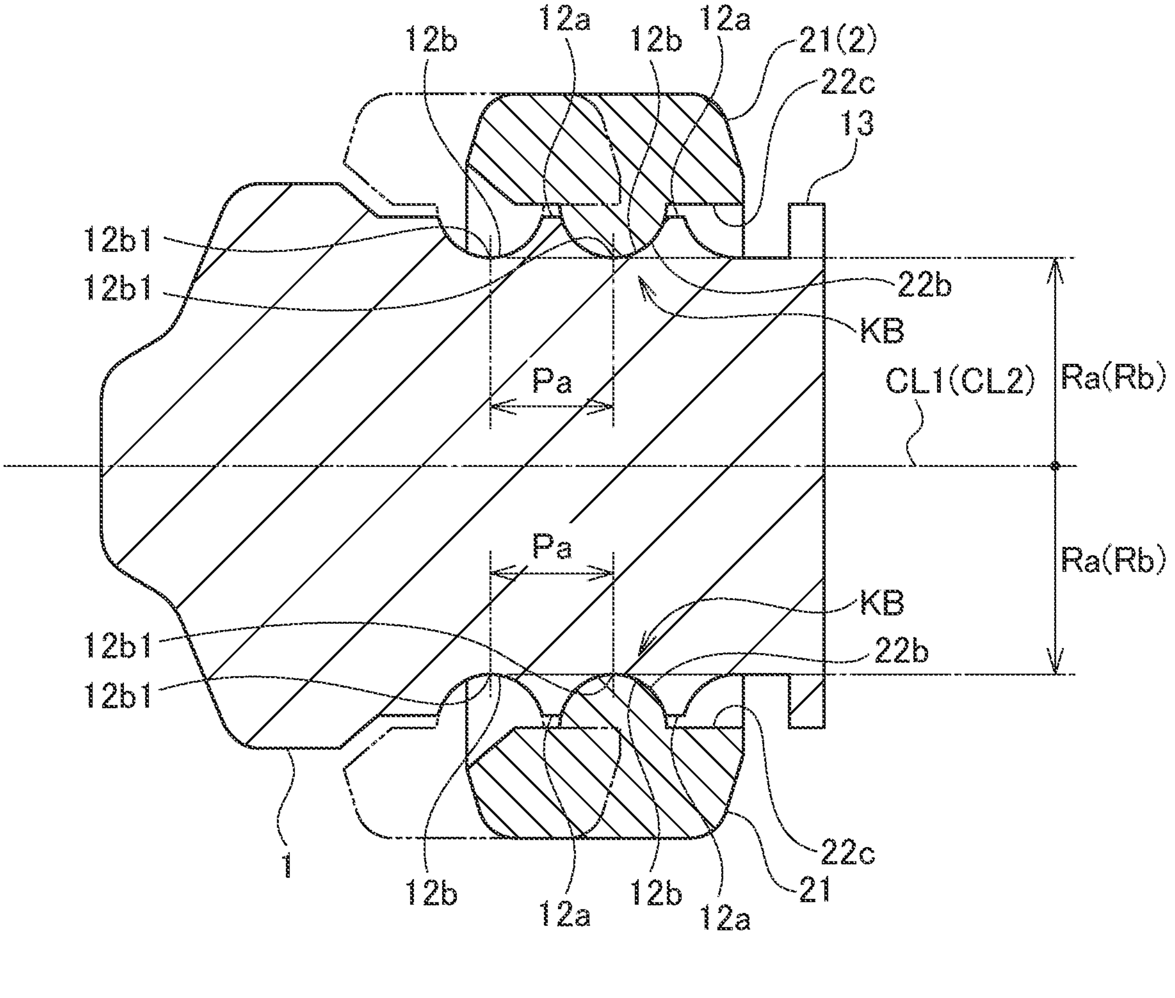
FIG. 6 is a schematic vertical cross-sectional view taken along the position S5-S5 in FIG. 2, illustrating an attached state of the hook 2 with respect to the body part 1 at a first angle.

As illustrated in FIG. 6, a distance between the lowest bottom parts 12*bl* of the respective two recesses 12*b* in the direction of the axial line CL1 is defined as a pitch Pa. As illustrated in FIG. 3 and FIG. 4, the radius Ra that is a distance between the lowest bottom part 12*bl* of each recess 12*b* and the axial line CL1 conforms to the radius Rb of the small-diameter circumferential part 12*c*.

As illustrated in FIG. 2 to FIG. 4, the hook 2 includes an engagement base part 21 and a hook part 23.

The engagement base part 21 is formed into a ring-like shape having a penetration hole 22. The hook 2 is attached to the body part 1 such that the penetration hole 2 is fitted to the attachment part 11 of the body part 1.

The hook part 23 extends from the outer circumferential surface of the engagement base part 21 in the direction perpendicularly away from the axial line CL2. The hook part 23 extends from the engagement base part 21 and is curved toward the tip end side so as to serve as a part hooked on the outside of the auricle E of the user 92.

The hook 2 is formed from flexible material so as to have flexibility. An example of flexible material is silicone rubber or thermoplastic elastomer.

As illustrated in FIG. 3, FIG. 4, and FIG. 6, the hook 2 includes an engagement circumferential part 22*a*, a hook projection 22*b*, and a clearance circumferential part 22*c* on the inner circumferential surface of the penetration hole 22 in the engagement base part 21.

The paired engagement circumferential parts 22*a* are provided to be opposed to each other and are each formed within a range of an angle θe on the inner circumferential surface of the penetration hole 22, as illustrated in FIG. 4. The engagement circumferential parts 22*a* are defined to have substantially the same inner diameter (the same radius Rb) as the small-diameter circumferential parts 12*c* in the attachment part 11 of the body part 1.

The clearance circumferential part 22*c* is a region having an inner diameter greater than the outer diameter of the paired projections 12*a* of the attachment part 11, and is located at two positions opposed to each other in the circumferential direction and each provided within a range of a predetermined angle.

In particular, the respective clearance circumferential parts 22*c* are provided in the range greater than the range of the respective projections 12*a* in the circumferential direction in the attachment part 11 of the body part 1. FIG. 4 illustrates the case in which the respective clearance circumferential parts 22*c* are provided in the range greater than the range of the respective projections 12*a* by the sum of the angle θa and θb.

As illustrated in FIG. 6, the hook projection 22*b* is provided in the middle of the engagement base part 21 in the direction of the axial line CL2 at the respective clearance circumferential parts 22*c* so as to have a smaller outer diameter defined by the respective apexes that are the tip ends than the inner diameter defined by the paired clearance circumferential parts 22. The hook projections 22*b* have the shape in the lateral cross section conforming to the recesses 12*b* in the attachment part 11 of the body part 1, so as to be engaged to the recesses 12*b*. The hook projections 22*b* in this example are each formed into an arc-like shape having the same radius as the recesses 12*b* in the lateral cross section.

The hook 2 is formed from material having flexibility, and the penetration hole 22 thus can be elastically deformed to be expanded in the radial direction by the fingers, so that the flange 13 is caused to climb over to be fitted to the attachment part 11 of the body part 1.

When the penetration hole 22 is fitted to the attachment part 11, the hook projections 22*b* are fitted to any of the defined plural recesses 12*b* of the attachment part 11. FIG. 6 illustrates the case in which the hook projections 22*b* are fitted to the recesses 12*b* closer to the flange 13.

As illustrated in FIG. 4, the two projections 12*a* of the attachment part 11 are formed so as to be located in the middle in the circumferential direction in the respective paired clearance circumferential parts 22*c* of the hook 2 when the penetration hole 22 is fitted to the attachment part 11.

As illustrated in FIG. 4, since the angle θc, which is the formation angle of the respective projections 12*a* in the circumferential direction, is set to be smaller than the formation angle of the clearance circumferential part 22*c* (the angle θa+the angle θb+the angle θc), the hook 2 can be rotated with respect to the body part 1 by the angle θa in the clockwise direction and by the angle θb in the counterclockwise direction.

The respective engagement circumferential part 22*a* of the penetration hole 22 of the hook 2 are slidably rotated along the small-diameter circumferential part 12*c* of the body part 1, or are rotated with a quite small gap interposed therebetween. The hook 2 is thus rotated about the axial line CL1 in a smooth state with substantially no movement in the radial direction. The axial line CL2 in this example conforms to the axial line CL1 of the engagement base line 21.

FIG. 5 is a view illustrating a rotated state of the hook 2 about the axial line XL1 (conforming to the axial line CL2) with respect to the body part 1. As described above, the hook 2 can be rotated within the range of the angle of θa+θb with respect to the body part 1. The rotational resistance of the hook 2 is set to a degree that does not lead the hook 2 to be rotated in a natural state but allows the hook 2 to be rotated by the intended operation made by the fingers of the user 92.

The attached position of the hook 2 with respect to the body part 1 in the extending direction of the axial line CL1 can be set to a favorable position per pitch Pa depending on which recesses 12*b* of the body part 1 the hook projections 22*b* are engaged, as illustrated in FIG. 6.

In this example in which the two sets of the recesses 12*b* are provided, as illustrated in FIG. 6, the hook 2 can be selectively attached to one of the two positions: the position closer to the flange 13 indicted by the solid line and the position away from the flange 13 indicated by the chain line.

Figure 7:
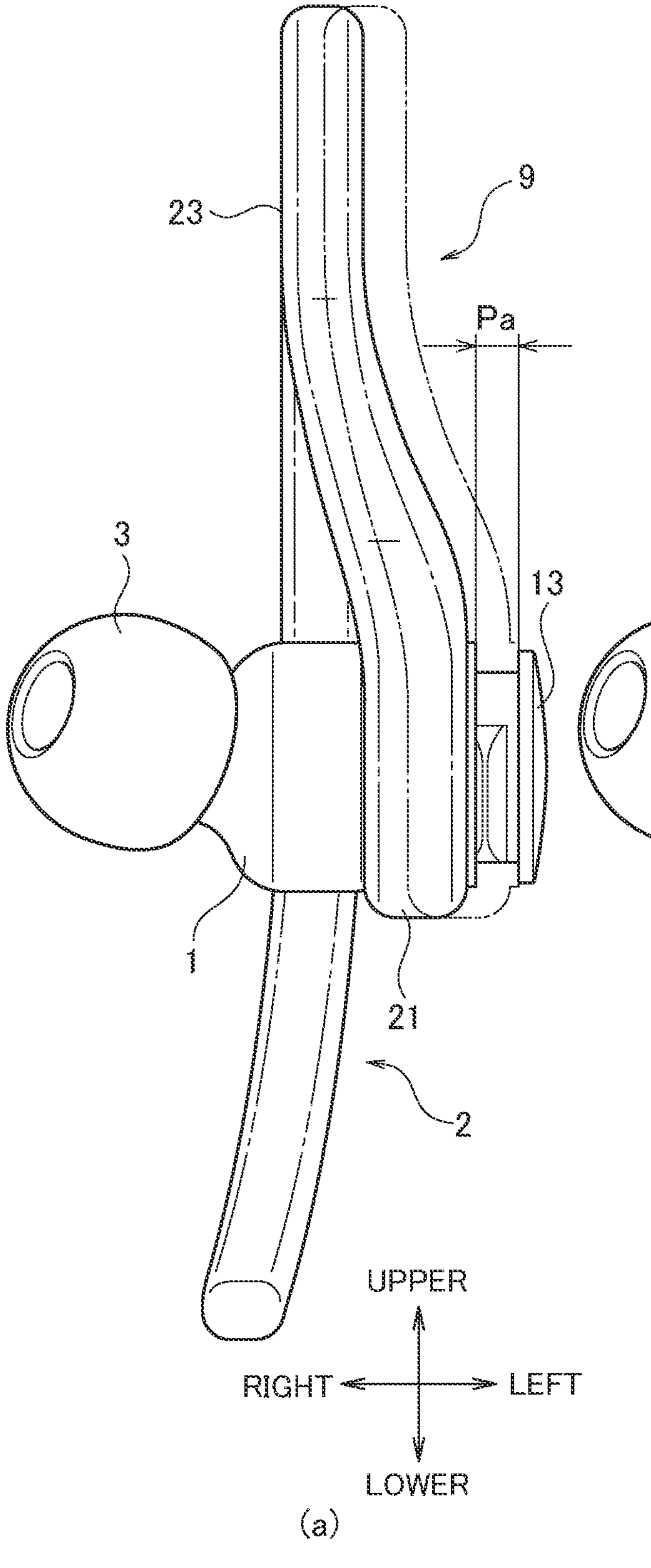
FIG. 7 is a front view of the earphone 91 for explaining the position of the hook 2 in the right-left direction with respect to the body part 1.

FIG. 7 is a view illustrating two different attached states of the hook 2 with respect to the body part 1 in the direction of the axial line CL1 (conforming to the axial line CL2). In particular, FIG. 7(*a*) is a view illustrating the state in which the hook 2 is attached to the position away from the flange 13, and FIG. 7(*b*) is a view illustrating the state in which the hook 2 is attached to the position closer to the flange 13.

Figure 8:
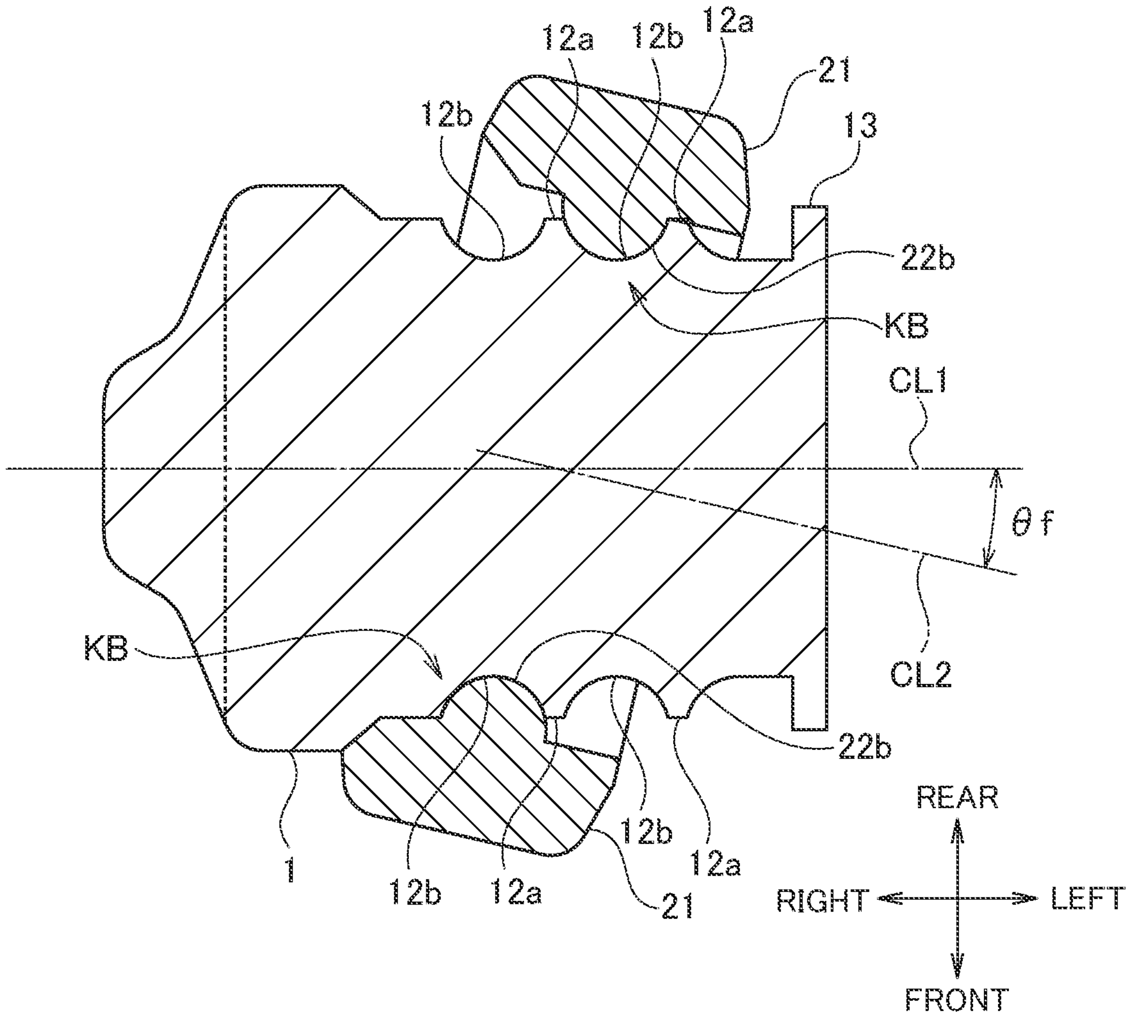
FIG. 8 is schematic vertical cross-sectional view taken along the position S5-S5 illustrating an attached state of the hook 2 with respect to the body part 1 at a second angle.

As described above, the earphone 91 includes the hook 2 having flexibility, and the recesses 12*b* and the hook projections 22*b* provided at the two separated positions so as to be opposed to each other in the circumferential direction. The respective two hook projections 22*b* of the hook 2 thus can be engaged to the different recesses 12*b* provided at the different positions in the extending direction of the axial line CL1, as illustrated in FIG. 8.

This configuration can allow the hook 2 to be attached to the body part 1 in the attitude in which the axial line CL1 and the axial line CL2 are inclined to each other. The inclined angle is defined as an angle θf.

Figure 9:
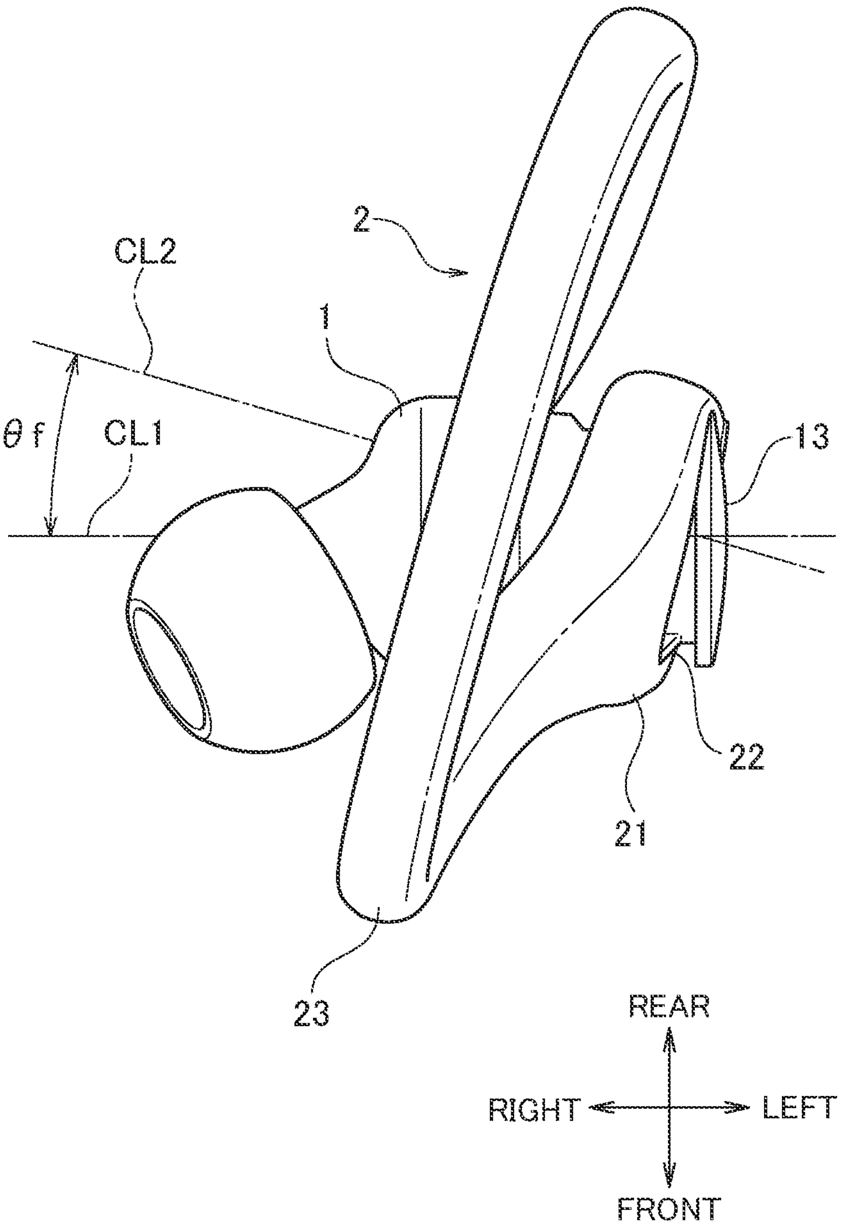
FIG. 9 is a top view illustrating the attached state at the second angle.

FIG. 9 is a top view illustrating the external appearance of the earphone 91 in the attitude in which the hook 2 is attached to the body part 1 in the inclined state. FIG. 9 more particularly illustrates a mode in which the hook 2 is attached to the body part 1 in the attitude in which the axial line CL2 is inclined to the axial line CL1 by the angle θf in the right and rearward direction.

The hook 2, of course, can be attached to the body part 1 in the attitude in which the axial line CL2 is inclined to the axial line CL1 by the angle θf in the right and forward direction such that the hook projections 22*b* are engaged to the recesses 12*b* in the opposite manner.

The direction in which the hook 2 is inclined with respect to the body part 1 by the angle θf is determined depending on the formed positions of the two sets of the recesses 12*b* in the circumferential direction.

The respective sets of the recesses 12*b* in this example are opposed to each other in the substantially front-rear direction. The hook 2 is thus configured to allow the hook part 23 extending upward to be hooked on the auricle E when the hook projections 22*b* are engaged to either set of the recesses 12*b* opposed to each other in the front-rear direction.

Alternatively, the respective sets of the recesses 12*b* may be formed to be opposed to each other in the upper-lower direction, for example, so that the hook 2 can be attached to the body part 1 in the attitude in which the axial line CL2 of the hook 2 is inclined to the axial line CL1 of the body part 1 in the right and upward direction or the right and downward direction.

As described above, the earphone 91 has the structure in which the hook 2 can be rotated relative to the body part 1 within the range of the predetermined angle (θa+θb) about the axial line CL1 of the body part 1.

The earphone 91 also has the structure in which the hook 2 can be attached to the body part 1 selectively at any of the plural positions defined in the extending direction of the axial line CL1 of the body part 1.

The earphone 91 also has the structure in which the hook 2 can be attached to the body part 1 in the state in which the axial line CL2 of the hook 2 is inclined to the axial line CL1 of the body part 1.

The user 92 of the earphone 91 thus can independently choose the rotated position of the hook 2, the position of the hook 2 in the axial direction, and the inclination of the hook 2 when determining the attached position of the hook 2 with respect to the body part 1. The user 92 can also choose the combination between the rotated position and the position in the axial direction of the hook 2 and between the rotated position and the inclination of the hook 2.

The earphone 91 thus enables each individual user to have a comfortable fitting feeling by adjusting the position and the attitude of the hook 2 with respect to the body part 1.

It should be understood that the above example is not intended to be limited to the configurations described above, and the example can be modified within a range not departing from the scope of the present embodiment.

The earphone 91 is not limited to the canal-type earphone that is used such that the ear piece is inserted to the external auditory meatus. The earphone 91 may be an in-ear-type earphone that does not include the sound channel part 14 but is used such that the body part 1 is attached into the auricle E.

In the earphone 91, the set of the recesses 12*b* and the hook projections 22*b* engaged to each other is referred to below as a "recess-projection engagement part KB", as illustrated in FIG. 4, FIG. 6, and FIG. 8.

The recess-projection engagement between the recesses 12*b* of the body part 1 and the hook projections 22*b* of the hook 2 may have an inverted relation. In particular, one in the recess-projection engagement part KB on the body part 1 side may serve as a projection, and the other one on the hook 2 side may serve as a recess.

While the above example is illustrated with the case in which the two pairs of the recess-projection engagement parts KB are separately provided so as to be opposed to each other in the circumferential direction, the recess-projection engagement parts KB may be provided at three or more parts.

The lateral cross-sectional shape of each of the recesses 12*b* and the hook projections 22*b* is not limited to the arc-like shape as described above, and may be any shape such as a triangle or a rectangle.

The engagement depth, the range of the engagement angle in the circumferential direction, the pitch Pa, the range of the rotatable angle, and the like with regard to the recess-projection engagement part KB may be optionally determined.

The supporter is not limited to the hook 2 to be hooked on the outside of the auricle as described above, and may be an arm-like supporter to be engaged to the inside of the auricle, such as an inner wall of the antihelix.

The earphone 91 is not limited to the wireless-type earphone, and may be a wired-type earphone. When the earphone 91 is a wired-type earphone, a cord is extracted to the outside from the base part 15 of the body part 1, and is retracted to the inside of the hook part 23 through the root part of the hook part 23 of the hook 2. The cord retracted to the inside of the hook part 23 is extracted to the outside from the tip through the inside of the hook part 23.

What is claimed is:

1. An earphone comprising:

a body part including a cylindrical part and formed to project to an outside of an auricle of a user;

a supporter attached to the body part; and a recess-projection engagement part configured to allow the supporter to be engaged to the body part selectively at any of a plurality of positions defined in an extending direction of an axial line of the body part, wherein the recess-projection engagement part comprises:

a plurality of recesses provided in either the body part or the supporter, the recesses being located separately from each other in the extending direction of the axial line and each provided within a range of a predetermined angle in a circumferential direction; and a projection provided in another one of the body part and the supporter so as to be selectively engaged to any of the plural recesses, wherein the earphone comprises two sets of the plural recesses and the projection provided at positions opposed to each other in the circumferential direction, and wherein the projections in the respective sets can be engaged to the recesses provided at positions different from each other in the extending direction of the axial line in one set and in another set.

2. The earphone according to claim 1, wherein the supporter is attached to an outer circumferential surface of the body part.

3. The earphone according to claim 1, wherein the supporter can be rotated with respect to the body part about the axial line.

4. The earphone according to any one of claim 1, wherein the extending direction of the axial line is a right-left direction of the user in a state in which the earphone is put on the auricle of the user.

5. The earphone according to any one of claim 1, wherein the supporter is a hook to be hooked on the outside of the auricle.

* * * * *